United States Patent [19]
Lee et al.

[11] 4,052,896
[45] Oct. 11, 1977

[54] ULTRASONIC FLOW METER

[75] Inventors: Bock W. Lee, El Cerrito, Calif.;
William H. Vander Heyden; Stephen
S. Bell, both of Tulsa, Okla.

[73] Assignee: Badger Meter, Inc., Richmond, Calif.

[21] Appl. No.: 635,737

[22] Filed: Nov. 26, 1975

[51] Int. Cl.² ............................................. G01F 1/66
[52] U.S. Cl. .................................................. 73/194 A
[58] Field of Search ............................ 73/67.6, 194 A

[56] References Cited
U.S. PATENT DOCUMENTS

| | | | |
|---|---|---|---|
| 3,007,339 | 11/1961 | Hill | 73/194 A |
| 3,209,591 | 10/1965 | Lester et al. | 73/194 A X |
| 3,568,661 | 3/1971 | Franklin | 73/194 A X |
| 3,861,211 | 1/1975 | Dewan | 73/194 A |
| 3,935,735 | 2/1976 | Lee | 73/194 A |

*Primary Examiner*—Charles A. Ruehl
*Attorney, Agent, or Firm*—Lothrop & West

[57] ABSTRACT

An improved apparatus and method for measuring fluid flow in a conduit enables the transmission of ultrasonic signals through the fluid with low signal attenuation and unique phase determination. Ultrasonic burst signals are simultaneously transmitted to axially spaced receivers adjacent a conduit. The transmitted signal is made up of a signal burst having two different frequency signals. The signal frequencies are selected to prevent unwanted signal attenuation by entrapped gases in the fluid and to allow an unambiguous phase determination for the received signal burst.

23 Claims, 5 Drawing Figures

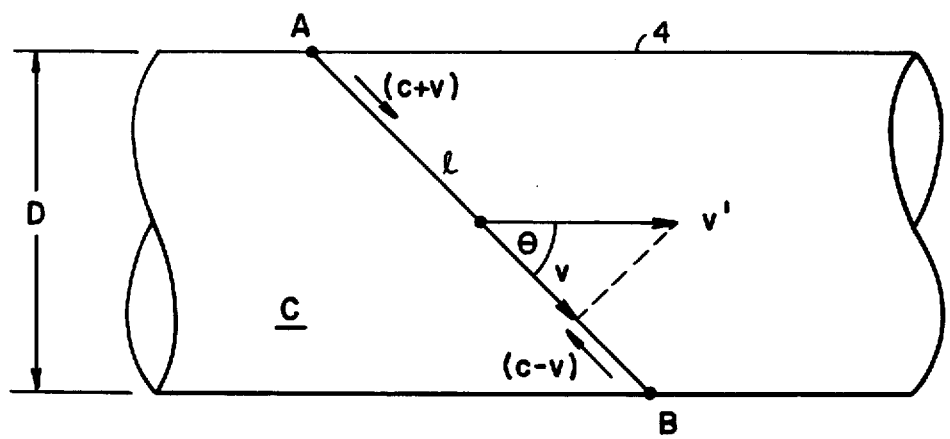

- $v'$ = FLUID FLOW VELOCITY
- $D$ = DIAMETER OF CONDUIT
- $\theta$ = ANGLE OF ULTRASOUND PATH
- $l = D/\sin\theta$, LENGTH OF ULTRASOUND PATH
- $v = v'\cos\theta$, FLOW VELOCITY ALONG ULTRASOUND PATH
- $C$ = ULTRASOUND PROPAGATION VELOCITY

FIG_1

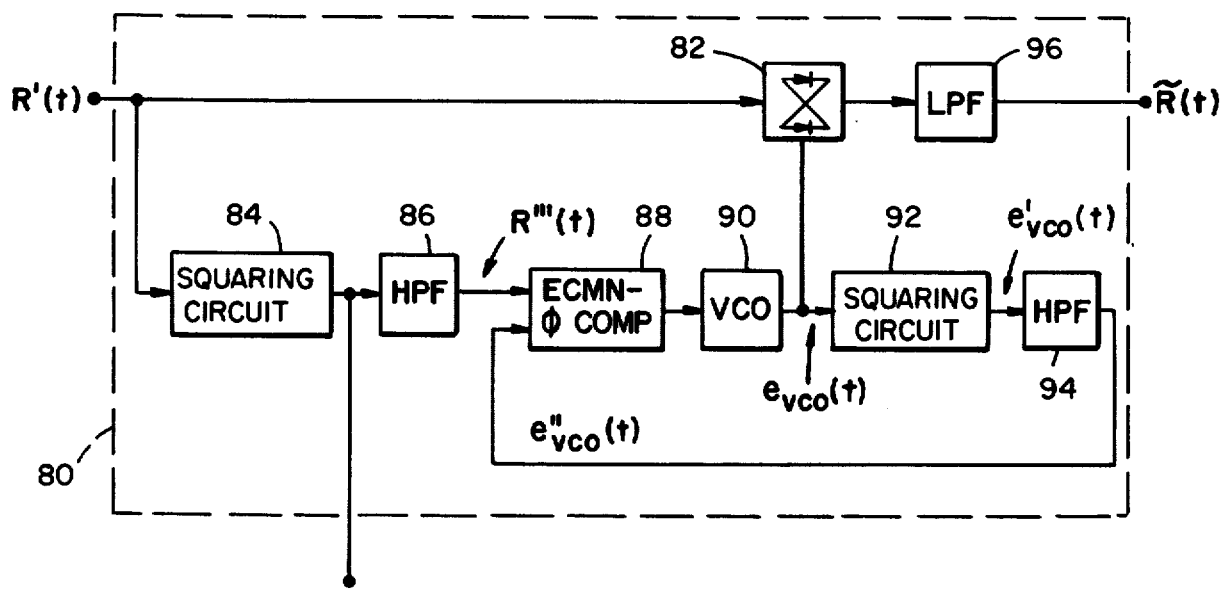

$R'(t) = E' \sin w(t-T) \cos w_1(t-T) \cdot G(t-T)$ $R'''(t) = E''' G(t-T) \cos 2w_1(t-T)$ $e_{vco}(t) = E_{vco} \cos w_1(t-T)$ $\widetilde{R}(t) = \widetilde{E} \sin w(t-T) \cdot G(t-T)$

FIG_5

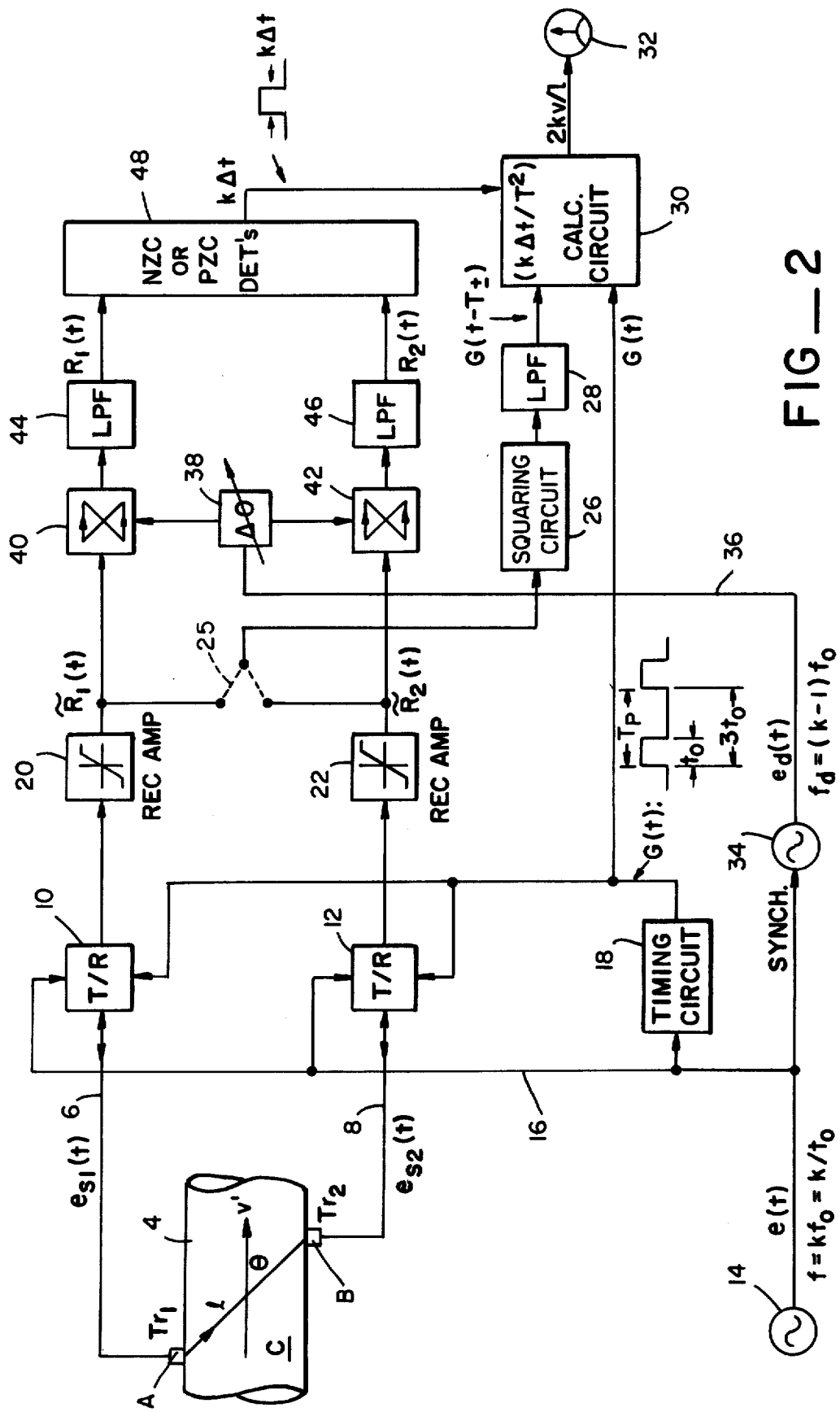
FIG_2

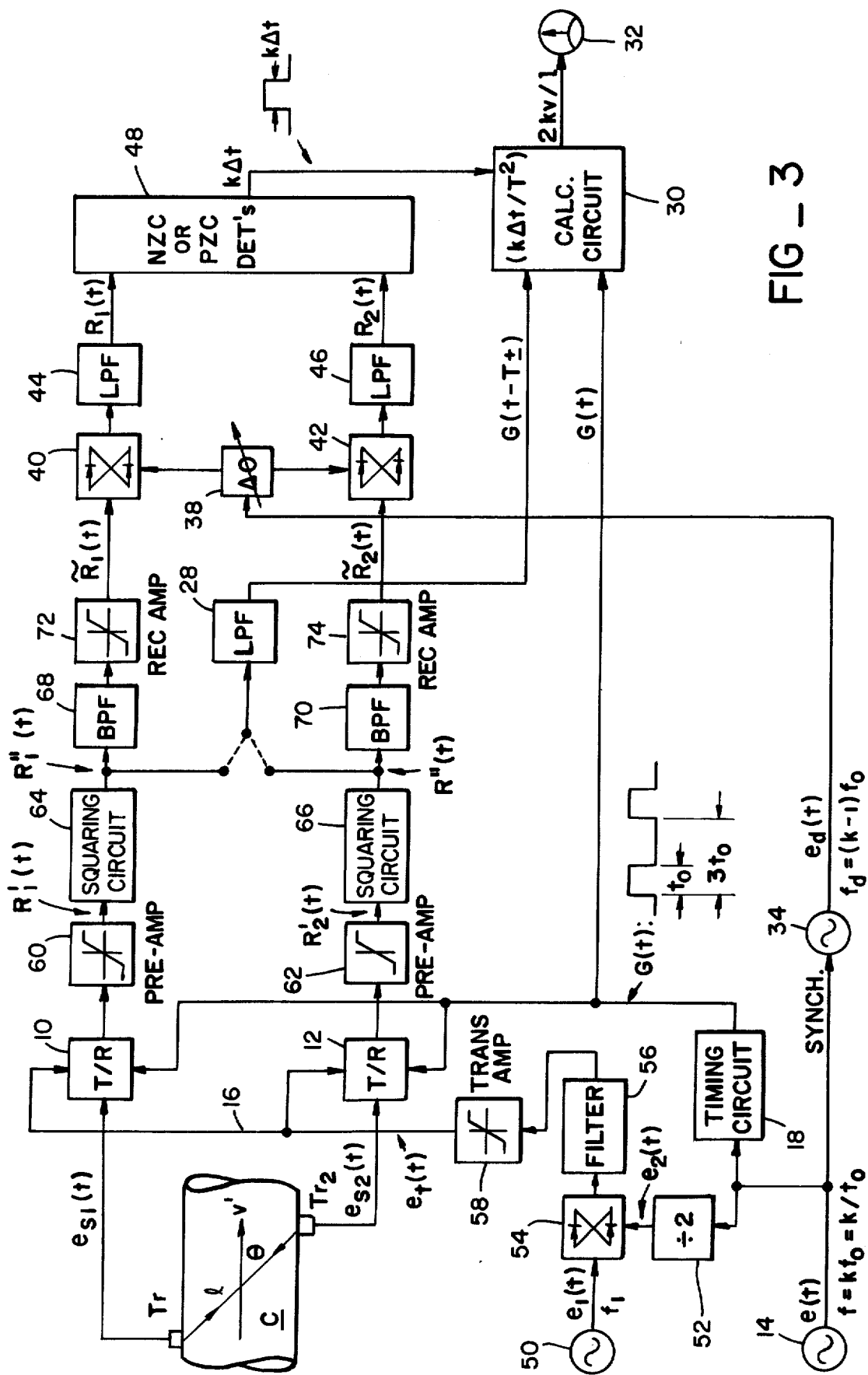
FIG_3

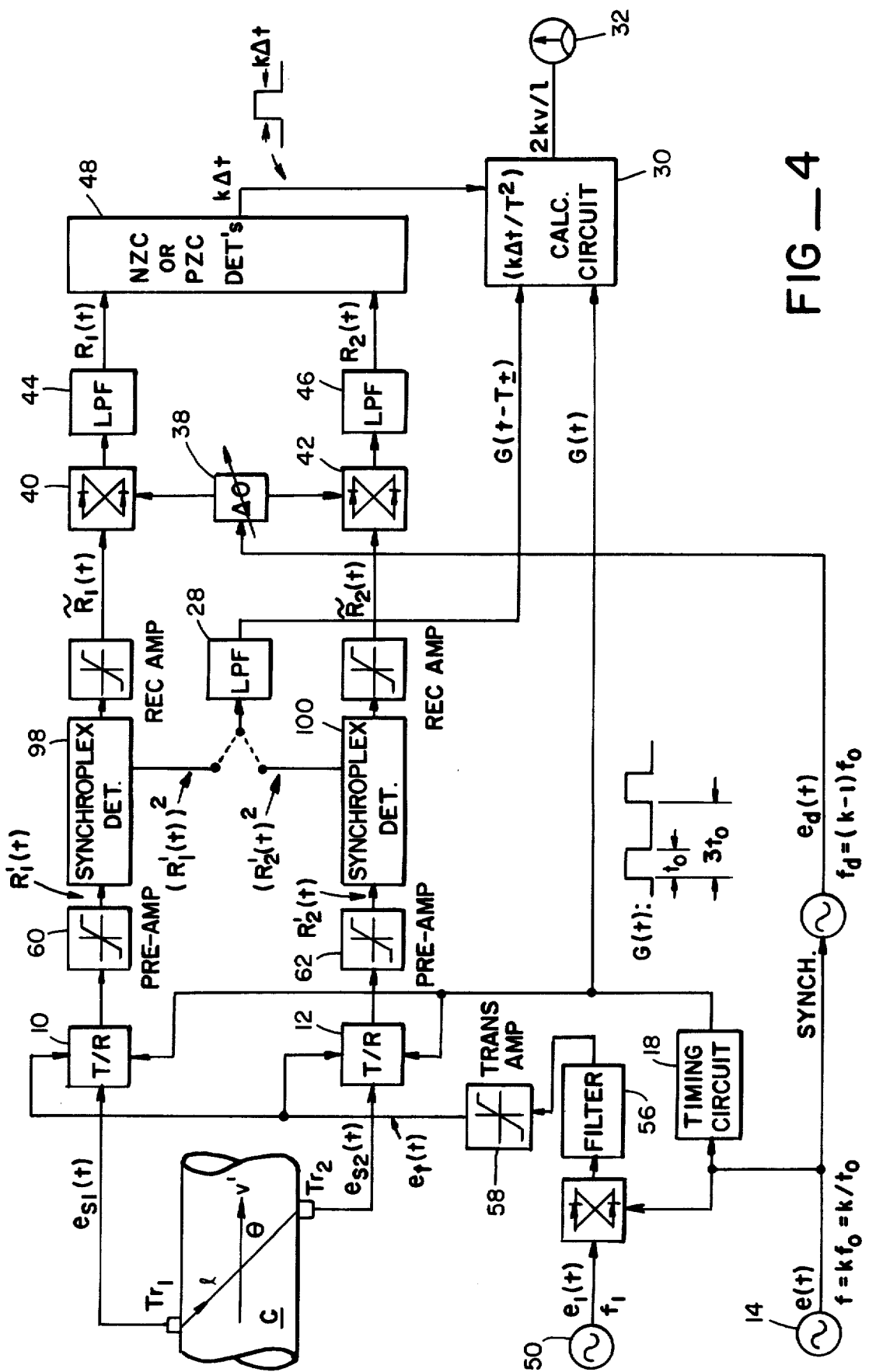
FIG—4

ULTRASONIC FLOW METER

BACKGROUND OF THE INVENTION

1. Field of the Invention

The invention is in the field of fluid flow meters and in particular ultrasonic flow meters.

2. Description of the Prior Art

In the velocity measurement of fluids flowing through a pipe line it is desirable to provide an arrangement for detecting the fluid flow, usually liquid flow, in a non-invasive fashion and with considerable accuracy and with mechanisms which are relatively inexpensive and long lived. It is also desirable to have a measuring device which will easily afford a plain readout unaffected within wide tolerances by variations in temperature and comparable ambient conditions. Ultrasonic flow meters have been known in the past, as for example those described in the in the U.S. Pat. No. 3,738,169 to Courty and U.S. Pat. No. 3,935,735 in the name of Bock W. Lee assigned to the same assignee as the instant invention. As explained more fully in the aforesaid patent, it is conventional to utilize a pair of simultaneously transmitted ultrasonic burst signals directed along opposite directions in a path between axially spaced receivers. The received burst signals are processed to obtain a time signal, $t$, representative of the time between the simultaneous transmission and the first received signal, and a transit time difference signal, $\Delta t$, representative of the difference in time between the pair of received burst signals. The desired velocity flow measurement is then computer utilizing a $\Delta t$ divided by $t^2$ calculation which provides an indication of fluid flow independent of temperature and comparable ambient conditions.

In systems of the type described above, it is desirable to maintain an unambiguous phase relationship between the pair of received burst signals so that corresponding cycles of the received burst signals may be compared to obtain the transit time difference signal $\Delta t$. The requirement of a unique phase determination upon the received burst signal imposes a predetermined upper limit on the transmission frequency $f$ utilized in making up the ultrasonic burst signals. However, additional consideration must be given to the selection of the ultrasonic frequency in view of the continual presence of gas bubbles in the moving liquid.

It is known that the presence of gas bubbles in a liquid can introduce signal attenuations as high as 60 db or more per centimeter for frequencies below one megahertz, while transmissions with relatively low attenuations can be achieved reliably for frequencies above a few megahertz. This phenomenon is generally explained by considering the thermal relaxation of the gas bubbles and the surface tension forces effective during the collision of one bubble with another. Due to the compressibility of the entrapped gas, a gas bubble is set into vibration by the ultrasound. Depending on the size of the gas bubble, the vibrations may be close to or in tune with its natural thermal relaxation frequency, which is inversely proportional to the diameter of the bubble. To the extent that these vibrations represent energy absorbed from the ultrasound wave, maximum signal atenuation occurs when the ultrasound frequency is resonant with the relaxation frequency of the gas bubble. In the aggregate, maximum signal attenuation occurs when the ultrasound frequency coincides with the characteristic relaxation frequency of the gas bubbles corresponding to the peak of the bubble size distribution.

Consideration of surface tension forces effective upon the collision of one gas bubble with another leads to the conclusion that the gas bubbles tend to merge into a larger bubble rather than breaking up. Thus, regardless of the initial distribution of bubble sizes, the distribution in time will move toward the larger sizes, and the absorption spectrum of the aggregate will move toward the lower frequencies below one megahertz.

For many practical applications, the entrainment of gas bubbles in the flowing liquid is unavoidable. In order to insure transmission with reasonable attenuation and achieve signal to noise ratios adequate for precise measurement, the ultrasound frequency should be chosen above a few megahertz. However, the desirability of having an unambiguous phase determination for comparing received pairs of signals imposes a selection of frequency less than a calculable predetermined amount. The upper limit established by the predetermined amount (for example a 100KHz limit) often conflicts with the requirement of high frequency transmission for low attenuation, especially in the region of large pipe diameters and/or high fluid velocities. Thus, on the one hand, the phase ambiguity condition requires the frequency be limited below a certain upper limit in order to make the extraction of transit time information from the accumulated phase shift unique. On the other hand, the absorption spectrum of entrained gas bubbles requires the selection of a frequency above the megahertz range in order to insure ultrasonic transmission with reasonable attenuation and thereby achieve adequate signal to noise ratios required for precise measurements. The instant apparatus and method solves the conflicting problems in the selection of frequency and permits both adequate signal transmission strength and unique phase determination.

SUMMARY OF THE INVENTION

It is therefore an object of the invention to provide an ultrasonic flow meter which overcomes the disadvantages of the prior art and provides a method and apparatus for permitting both adequate signal transmission strength and unique phase determination.

Another object of the invention is, in general, to provide an improved flow meter particularly in the realm of large pipe diameters and/or high fluid velocities.

A further object of the invention is to provide an improved signal transmitting apparatus and method for use in a flow meter such that phase uniqueness may be maintained between the received signals and adequate signal to noise ratios may be maintained during transmission through the fluid.

The flow detection apparatus of the instant invention comprises a pair of transducers adapted to be disposed adjacent a conduit carrying the fluid for transmission and reception of compressional energy signals therethrough. Means are provided for generating a first signal having a frequency less than a predetermined upper limit so as to achieve unique phase determination between the received signals. Additionally, means are provided for generating a second frequency and for mixing the first and second frequencies to produce side band frequencies which are in turn transmitted through the fluid. The selection of the second frequency is such as to produce side band frequencies which are transmitted without substantial energy loss from entrained gas bubbles within the fluid. Means are provided for processing received signals according to the $\Delta t$ divided by $t^2$ calculation and for providing a corresponding output signal indicative of fluid flow.

BRIEF DESCRIPTION OF THE DRAWINGS

These and other objects of the invention will become clear from the following description of the invention as illustrated in the drawings wherein:

FIG. 1 is a diagram of a section of a pipe with a diagrammatically illustrated ultrasonic flow meter pursuant to the invention installed in connection therewith;

FIG. 2 is a block diagram illustrating a conventional ultrasonic flow meter utilizing a time magnifying and a $\Delta t$ divided by $t^2$ calculating technique of processing the received signals, as disclosed in the aforementioned application;

FIG. 3 is a block diagram illustrating one embodiment of the invention;

FIG. 4 is a block diagram illustrating yet another embodiment of the invention; and FIG. 5 is a block diagram illustrating the synchroplex detector of FIG. 4.

DESCRIPTION OF THE PREFERRED EMBODIMENT

FIG. 1 illustrates a section of a pipe having a fluid travelling therein. Transducers are positioned at points A and B axially spaced from one another on opposite sides of the pipe. As illustrated in FIG. 1, the fluid flow velocity $v'$ has a component $v$ along the path joining points A and B. By placing ultrasonic transducers at points A and B and simultaneously sending out ultrasonic signals, one can utilize the received signals to determine the respective transit times. The velocity of propagation in the direction from point A to point B is $(c + v)$, and velocity of propagation in the direction from point B to point A is $(c - v)$ where $c$ is the ultrasonic propagation velocity in the stationary fluid. Thus, the transit time, $t_+$, for ultrasonic waves to traverse from stationary point A to stationary point B is $$t_+ = l/(c+v), \tag{1}$$

and the transit time, $t_-$, to traverse from point B to point A is $$t_- = l/(c-v), \tag{2}$$

where $l$ is the distance between points A and B. The difference in transit times, $\Delta t$, is $$\Delta t = t_- - t_+ = 2lv/(c^2 - v^2), \tag{3}$$

which reduces to $$\Delta t \doteq 2lv/c^2, \tag{4}$$

because in all practical cases the propagation velocity $c$ is much greater than flow velocity component $v$ along the ultrasound path. From equation (4), it is evident that $v$ and therefore for flow velocity $v'$ can be determined from measurements of $\Delta t$.
Specifically, $$v = c^2 \Delta t / 2l, \tag{5}$$

and $$v' = c^2 \tan{-\cdot \Delta t/2D}. \tag{6}$$

In practice, $\Delta t$ itself is not measured directly. Instead the transit times $t_+$ and $t_-$ are measured and their difference is derived.

The transit time is measured by a phase shift technique which utilizes a long ultrasonic wave burst between points A and B. If the ultrasound coupled into the flowing fluid at the origination point is $$U(t) = U_o \mathrm{Sin}(wt),$$

where $w$ is the angular frequency of the ultrasecond, then the ultrasonic signal received at the destination point on the other side of the conduit, after an elapse or transit time of $t_\pm$ ($t_+$ or $t_-$), will be $$U^*(t) = D^*U(t-t_\pm) = D^*U_o \mathrm{Sin}(wt-\phi), \tag{7}$$

$$\phi = wt_\pm \tag{8}$$

where $D^*$ is the attenuation and dispersion factor. From equations (7) and (8), it is evident that the transit time $t_\pm$ can be measured by measuring the phase of the received signal, provided that the phase $\phi$ is less than $2\pi$ radians, i.e. provided that there is no phase ambiguity.

Measurement of transit times must be accomplished with great precision, because $\Delta t$ is very small compared to the quantities measured. In general, in order to achieve the great precisions required, repeated measurements and averaging are essential. Averaging is also essential for removing the perturbing effects of flow turbulence and other sources of noise. The time magnification technique is disclosed in U.S. Pat. No. 3,935,735, incorporated herein by reference, and is a refinement of the phase shift method which effectively magnifies $\Delta t$ by a factor $k$ equal to the number of cycles of ultrasound contained in a burst. When this technique is used with averaging, the problems associated with achieving great precision in the measurements of transit time are greatly reduced.

Equations (5) and (6) indicate that the flow velocity determined is dependent on the propagation velocity $c$, which varies with temperature in the case of incompressible fluids and with temperature and pressure in the case of compressible fluids. One may, however, make the velocity measurement independent of the propagation velocity, as discussed in the aforementioned patent. Briefly the method recognizes that, from equations (1) and (2), $$t_+ t_- = l^2/(c^2 - v^2) \tag{9}$$

and therefore, $$\Delta t/t_+ t_- = 2v/l \tag{10}$$

is independent of $c$. Since $c >> v$ in all practical cases, $t_+ \doteq t_- = t_\pm$, equation (10) reduces to $$\Delta t/t^2_\pm \doteq 2v/l \tag{11}$$

and equation (5) becomes $$v = l\Delta t/2t_\pm^2 \tag{12}$$

As indicated in equation (12), the fluid velocity $v$ may be determined independently of propagation velocity $c$ by measuring the quantity $\Delta t/t^2_\pm$.

The instant phase shift approach to measurements of transit times requires the use of sequences of bursts of ultrasonic waves traveling in opposite directions along a single ultrasound path. A phase shift $\Delta t$ ultrasonic flowmeter is illustrated in FIG. 2. A pipe 4 is shown carrying a fluid having velocity $v'$. Adjacent the pipe and axially disposed from one another are transducers $T_{r1}$ and $T_{r2}$ positioned at points A and B respectively. The transducers $T_{r1}$ and $T_{r2}$ are connected via lines 6 and 8 to respective transmit/receiver (T/R) switches 10 and 12 which are utilized to alternately energize the transducers for transmitting the ultrasonic burst and to receive the burst signals propagated through the fluid. The T/R switches 10 and 12 are connected to a signal generator 14 by line 16 which also provides a signal to a timing circuit 18. The signal generator 14 is used to generate a continuous sinewave of a specific frequency $f$, $$f = 2\pi w = k f_o, f_o = 1/t_o \quad (13)$$

where $k$ is an integer corresponding to the number of cycles of ultrasonic waves to be transmitted in each burst, and $t_o$ is the time duration of each burst. The time varying output of generator 14 is given by $$e(t) = E \sin(wt) = E \sin(2\pi k f_o t). \quad (14)$$

The output of generator 14 is simultaneously applied to the T/R switches 10 and 12 which are themselves controlled by the timing circuit 18.

The output of the timing circuit is a periodic sequence of gates, each of time duration $t_o$, with a repetition period of $T_p = 3 t_o$ as illustrated in FIG. 2. Hence, the output of timing circuit 18 is a gate signal specified by, $$G(t) = \sum_{n=0}^{\infty} G_o(t - nT_p), \quad (15)$$

$$G_o(x) = \begin{cases} 1, & 0 < t < t_o \\ 0, & \text{otherwise.} \end{cases} \quad (16)$$

With this gate signal controlling the T/R switches 10 and 12, the transducers $T_{r1}$ and $T_{r2}$ are connected during each period $T_p$ first to the output of generator 14 for a time duration $t_o$ and then to the inputs of receiving amplifiers 20 and 22 for the remaining duration $2t_o$. The signals $e_{s1}(t)$ and $e_{s2}(t)$ at the transducers $T_{r1}$ and $T_{r2}$ are given by $$e_{s1}(t) = e_1(t) + r_1(t), \quad (17)$$

and $$e_{s2}(t) = e_2(t) + r_2(t), \quad (18)$$

where $e_1(t)$, $e_2(t)$ are excitations to the transducers consisted of bursts of $k$ cycles of sinusoidal waves of frequency $f = 2\pi k/t_o$, and $r_1(t)$, $r_2(t)$ are received signals from the receptions of ultrasound waves after traversing the ultrasound path in opposite directions. Provided that there is no overlap between the transmitted and received burst, the two component signals in (17) and (18) are disjointed in time, and the operations of the T/R switches 10 and 12 will be effective in separating the excitations to the transducers from the received signals directed to the receiving amplifiers 20 and 22. The amplifier outputs are $$\tilde{R}_1(t) = a_1 \tilde{E} G(t - T_-) \sin(w(t - T_-)), \quad (19)$$

and $$\tilde{R}_2(t) = a_2 \tilde{E} G(t - T_+) \sin(w(t - T_+)), \quad (20)$$

where $a_1$ and $a_2$ are the amplification factors, and $$T_- = t_- + \tau_-, \quad (21)$$

$$T_+ = t_+ + \tau_+. \quad (22)$$

The quantities $\tau_-$ and $\tau_+$ are time delays associated with the cables, electronic circuits and transducers. These quantities are nearly equal, and their difference, $$\Delta\tau = \tau_- - \tau_+ \quad (23)$$

is small and contributed by only the amplifiers 20 and 22 and the T/R switches 10 and 12. Expressions (19) and (20) show that the transit times are carried in the phases of the received signals. For extracting these quantities, several types of phase detectors can be used, but zero-crossing detectors provide the largest range and best linearity. Setting the expressions (19) and (20) to zero, the times of zero-crossing respectively of $\tilde{R}_1(t)$ and $\tilde{R}_2(t)$ are given by:

$$t_{z1} = M\pi/w + T_-, \quad (24)$$

and $$t_{z2} = N\pi/w + T_+, \quad (25)$$

where M and N are integers such that $t_{z1}$ and $t_{z2}$ fall within the time apertures defined by $G(t-T_-)$ and $G(t-T_+)$. If the zero-crossing detectors are responsive only to positive going crossings, M and N are restricted to even integers; if they are responsive only to negative going crossings, M and N are restricted to odd integers. The former type will be referred to as PZC detectors and the latter type will be referred to as NZC detectors. For the case of either PZC or NZC detectors, the integers M and N, which correspond to adjacent detected zero-crossings of $\tilde{R}_1(t)$ and $\tilde{R}_2(t)$, will be equal, i.e. M=N, provided the equation $$w(T_- - T_+) = w(\Delta t + \Delta\tau) < 2\pi \quad (26)$$

is satisfied. This condition is the phase ambiguity condition for either PZC and NZC detectors. For other types of phase detectors, a more restrictive phase ambiguity condition will be applicable. Provided condition (26) is satisfied, the differential output of the zero-crossing detectors corresponding to a pair of adjacent zero-crossings of $R_1(t)$ and $R_2(t)$ is $$\Delta t_z = t_{z1} - T_{z2} = T_- - T_+ = \Delta t + \Delta\tau, \quad (27)$$

which is the desired difference in transit times except for the off-set term. The off-set term is eliminated through some compensation mean or through careful matching of the T/R switch and amplifier delays.

A measure of $T_\pm$ required for ultrasound velocity independence, is achieved by squaring either $\tilde{R}_1(t)$ or $\tilde{R}_2(t)$ and passing the result through a low-pass filter to remove all but the low frequency component. Thus, one of the signals $R_1(t)$ and $R_2(t)$ from amplifiers 20 and 22 is fed via switch 25 to a squaring circuit 26 which provides as its output the square of its input signal. (Such detectors are generally called "square-law" detectors.) The squared output signal from squaring circuit 26 is then fed to a low pass filter 28 which is connected to a calculating circuit 30. Such an operation yields a time aperture signal at the output of filter 28 defined by $G(t-T_{\pm})$. From the beginning of each operating period $T_p$ to the leading edge of this time aperture signal is a time interval of $T_{\pm} = t_{\pm} + \tau_{\pm}$, and to the center of the aperture is a time interval of $T_{\pm} = t_o/2$. Either time interval can be used to yield a measure of $t_{\pm}$ which is used in the calculating circuit 30 of FIG. 2 along with the quantity $\Delta t$ to produce the desired output on a meter 32, namely, $$e_o = \Delta t/t_{\pm}2 = 2v/l \tag{28}$$

For a given ultrasound frequency $f = w/2\pi$, the phase ambiguity restriction (26) requires the full scale flow velocity $v_{fs}$ be limited by the condition:

$$|v_{fs}| < c^2(1/f - \Delta\tau)/2. \tag{29}$$

Alternatively, for a given full-scale flow velocity, $v_{fs}$, the ultrasound frequency must be limited according to the condition $$f < 1/(\Delta t + \Delta \tau) = 1/(2v_{fs}l/c^2 + \Delta \tau). \tag{30}$$

For all cases of ultrasonic flow measurements the ratio $v_{fs}/c$ is very small. Since $\Delta t = 2vl/c^2$, the differential transit time, $\Delta t$, may be so small that its accurate determination is beyond the state of art. For example, in a conduit in which $l = 1$ ft and $c = 5000$ ft/sec, a full scale velocity of 2.5 ft/sec would yield a $\Delta t$ of only $2 \times 10^{-7}$ seconds. For a measurement accuracy of 1%, $\Delta t$ would have to be determined with a resolution of less than $2 \times 10^{-9}$ seconds. While such a resolution is possible under certain conditions, the required precision is generally beyond that which could be acheived reliably in a commercial instrument.

The time magnification technique disclosed in detail in the aforementioned patent is a unique solution to the above problem. Briefly stated, time magnification is accomplished with the introduction of a modulation step between the signals $\bar{R}_1(t)$ and $\bar{R}_2(t)$ and their respective zero-crossing detectors. Thus, a generator 34 is provided as shown in FIG. 2. Generator 34 is synchronized in phase with signal generator 14 and is connected via a line 36 to an adjustable phase shifter 38. The phase shifter 38 is connected to modulators 40 and 42 which receive the output signals $\bar{R}_1(t)$ and $\bar{R}_2(t)$ from receiving amplifiers 20 and 22 respectively. The outputs of modulators 40 and 42 are connected to low pass filters 44 and 46 respectively which in turn are connected to separate zero-crossing detectors indicated generally at 48. The zero-crossing detectors may be of the NZC or PZC type and provide output signals at a time $t_{z1}$ and $t_{z2}$ associated with the zero-crossing of the modulated signals from modulators 40 and 42 respectively. The first of the two zero-crossing signals $t_{z1}$ and $t_{z2}$ is used to provide the leading edge of a square wave pulse and the latter of the signals $t_{z1}$ and $t_{z2}$ is used to provide the trailing edge. Thus, a square wave pulse is generated at the output of 48 having a width proportional to $|\Delta t_z| = t_{z1} - t_{z2}|$. In the time magnification technique described in the aforementioned patent, the modulating signal is such as to insure that only a single cycle sinusoidal waveform is produced at the output of modulators 40 and 42. This is achieved by heterodyning the received burst signal made up of $k$ pulses with a frequency of $(k-1)fo$. Thus, the sinusoidal waveform of generator 34 provides a modulating carrier wave having a frequency $$f_d = (k-1)fo, \tag{31}$$

and is synchronized with $f$ or $fo$ in phase. The signals $R_1(t)$ and $R_2(t)$ at the inputs to the zero-crossing detectors are, therefore, $$R_1(t) = (a_1/2) \bar{E} \quad G(t - T_- - s_1,) \quad \text{Sin}(-w_o t - wT_- - s_1 - \Delta\phi/2), \tag{32}$$

and $$R_2(t) = (a_2/2) \bar{E} \quad G(t - T_+ - s_2) \quad \text{Sin}(w_o t - wT_+ - s_2 + \Delta\phi/2), \tag{33}$$

where $$w_o = 2\pi fo, \tag{34}$$

and $\Delta\phi/2$ is the phase shift from phase shifter 38 and $s_1$ and $s_2$ are the phase shifts due to the small time delays through the modulators 40 and 42 and the low pass filters 44 and 46. Comparisons of (32), (33) and (19), (20) show that these signals have the same forms, the only difference being the frequencies $w = 2\pi f$ and $w_o = 2\pi fo$ and the adjustable phase shifts in (32) and (33). The times of zero-crossings of the signals $R_1(t)$ and $R_2(t)$, as determined by the zero-crossing detectors, are respectively, $$t_{z1} = M\pi/w_o + kT_- + s_1/w_o + \Delta\phi/2w_o, \tag{35}$$

and $$t_{z2} = N\pi/w_o + kT_+ + s_2/w_o - \phi/2w_o, \tag{36}$$

where M and N are integers. Again, provided the condition $$kw_o(T_- - T_+) + (s_1 - s_2) + \Delta\phi < 2\pi \tag{37}$$

is satisfied, the integers M and N corresponding to adjacent crossings will be the same for the case of either PZC or NZC detectors, i.e. M=N. Then, $$\Delta t_z = k\Delta t + k\Delta\tau + (s_1 - s_2)/w_o + \Delta\phi/w_o, \tag{38}$$

and by setting the adjustable phase shifter so that, $$-\Delta\phi = (s_1 - s_2) + kw_o\Delta\tau = (s_1 - s_2) + w\Delta\tau, \tag{39}$$

$\Delta t_z$ reduces to $$\Delta t_z = k\Delta t. \tag{40}$$

Recall that $k$ is the number of cycles of ultrasonic waves in each transmitted burst. Expression (40) indicates that each cycle in the burst is utilized effectively to magnify the differential transit time $\Delta t$ and make it more measurable. Since $k$ can be a large number, for example 50, a very small $\Delta t$ of $2 \times 10^{-7}$ seconds can be effectively magnified to a $\Delta t_z$ of $10^{-5}$ seconds.

From (37), it follows that a time magnification ultrasonic flow meter is subject to the phase ambiguity condition:

$$w(\Delta t + \Delta \tau) + (s_1 - s_2) + \Delta\phi < 2\pi. \tag{41}$$

With proper adjustment of the phase shifter, according to equation (39), the phase ambiguity condition becomes $$w\Delta t < 2\pi. \tag{42}$$

The phase ambiguity condition is essentially the same one as for a phase shift ultrasonic flow meter without time magnification.

In order to avoid ambiguity in the extraction of transit time information from the phase of the received ultrasonic signals the frequency $f = w/2\pi$ of the ultrasound must be limited in accordance with the phase ambiguity condition (42). For a time magnification ultrasonic flow meter with proper adjustment of the correction phase $\Delta\phi$ or a phase shift flow meter with negligible electronic delays, the frequency $f$ is limited by the restriction:

$$f < c^2/2vL \tag{43}$$

For the cases of small size conduits and/or low flow velocities, the restriction on the frequency $f$ is of little significance, since frequencies up to tens of megahertz may be selected without violating the phase ambiguity condition. However, this is not the case for large size conduits and/or high low velocities. For example, in the case of a 10 ft. diameter conduit in which $l = 10/\sin 67° = 10.863$ ft., $c = 4200$ ft/sec, and $v_{fs} = 12 \cos 67° = 4.689$ ft/sec, the upper limit restriction on the frequency $f$ would be 173.155 KHz. While such an ultrasound signal can be generated, transmitted and received in non-aerated liquids easily, the presence of gas bubbles in aerated liquids can significantly increase the signal attenuation along the ultrasound path so that the received signal to noise ratios are too low for precise measurements of transit times. Thus, in order to have adequate signal to noise ratios to permit precise measurements, the ultrasound frequency should be chosen above a few megahertz. The apparatus shown in FIGS. 3 and 4 provides a solution to the conflicting ultrasound frequency requirements for unambiguous phase and low gas bubble attenuation for large size conduits and/or high fluid flow velocities.

By comparing the elements in FIG. 3 with those shown in FIG. 2, it is evident that the improved apparatus affects only the ultrasonic bursts to be transmitted across the ultrasound path and the pre-processing of the received signals. The signal processing after development of signals $R_1(t)$ and $R_2(t)$ is accomplished much the same as in FIG. 2. Similar circuit elements have thus been similarly labeled in FIGS. 2–4.

As shown in FIG. 3, signal generator 14 provides the sinusoidal waveform $e(t)$ of frequency $f = w/2\pi = kf_o$ as in FIG. 2; however, the output of generator 14 is not fed directly to the T/R switches 10 and 12 to form the ultrasonic bursts for transmission across the ultrasound path. Instead, the ultrasonic bursts are formed from the signal $e_t(t)$, which is derived from a prescribed modulation of a signal $e_2(t)$, derived from $e(t)$, and the output $e_1(t)$ of an additional sinusoidal generator 50. The signal $e_2(t)$ is derived from $e(t)$ by dividing the frequency of the latter by a factor of two in a frequency division circuit 52. Thus, the signal $e_2(t)$ is specified by $$e_2(t) = E_2 \sin(wt/2) = E_2 \sin(\pi k f_o t). \tag{44}$$

The additional sinusoidal generator 50 provides an output $$e_1(t) = E_1 \cos(w_1 t + \Phi), \tag{45}$$

where $f_1 = w_1/2\pi$ is chosen to reduce attenuation and thus provide optimum transmission through entrained gas bubbles. $\Phi$ is the arbitrary starting phase relative to that of the signal generator 14.

The signal $e_1(t)$ from generator 50 is combined with the signal $e_2(t)$ from frequency division circuit 52 in a modulator 54 which may produce, for example, a suppressed carrier amplitude modulated signal. Ordinary amplitude modulation may also be used. The output of modulator 54 is fed to a filter 56 to eliminate all but the principal modulation products, and the output of filter 56 is then passed to a transmission amplifier 58 for connection along lines 16 to the T/R switches 10 and 12. The signal $e_t(t)$ at the output of transmission amplifier 58 is given by $$e_t(t) = 2 E_t \sin(wt/2) \cdot \cos(w_1 t) = E_t(\sin(w_+ t) + \sin(w_- t)), \tag{46}$$

where $$w_+ = w_1 + w/2, \tag{47}$$

$$w_- = w_1 - w/2, \tag{48}$$

and for simplicity $\Phi = 0$ has been assumed without loss of generality.

The signal $e_t(t)$ as specified in (46) to (48) is applied directly to the T/R switches 10 and 12 to be formed into ultrasonic bursts for transmission across the ultrasound path in opposite directions. The transmitted ultrasonic bursts are gated bursts of two sinusoidal waveforms of different frequencies separated in frequency by $f = w/2\pi$. The gating signal $G(t)$ to T/R switches 10 and 12 is the same as in FIG. 2. With the same specification for the timing of the gate signal $G(t)$ as before, the transmitted bursts and the received bursts, after traversing the ultrasound path to the opposite sides, will again be disjointed in time. The T/R switches 10 and 12 will be effective in separating the received bursts from the composite signals and in feeding them to respective pre-amplifiers 60 and 62. The outputs of the pre-amplifiers are the signals $$R'_1(t) = a_1 \, E'G(t-T_-) \, (\sin(w_+(t-T_-)) + \sin(w_-(t-T_-))) \tag{49}$$

and $$R'_2(t) = a_2 \, E'G(t-T_+) \, (\sin(w_+(t-T_+)) + \sin(w_-(t-T_+))). \tag{50}$$

The signals $R'_1(t)$ and $R'_2(t)$ are fed to individual squaring circuits 64 and 66 respectively. The outputs of squaring circuits 64 and 66 are $$R''_1(t) = a_1 G(t-T_-) (E'_o + E'_1 \cos(w(t-T_-)) + E'_2 \cos(2w_1 (t-T_-))) \tag{51}$$

and $$R''_2(t) = a_2 G(t-T_+) (E'_o + E'_1 \cos(w(t-T_+)) + E'_2 \cos(2w_1 (t-T_{30}))). \tag{52}$$

In both (51) and (52), the desired terms are the ones involving the frequency $f = w/2\pi$; the other terms are removed by passing the outputs $R''_1(t)$ and $R''_2(t)$ through appropriate band-pass filters 68 and 70 respectively and then to respective receiving amplifiers 72 and 74. The resultant signals are $\bar{R}_1(t)$ and $\bar{R}_2(t)$, specified by $$\bar{R}_1(t) = a_1 \bar{E} \cos(w(t - T_-)) \tag{53}$$

and $$\bar{R}_2(t) = a_2 \bar{E} \cos(w(t - T_+)). \tag{54}$$

It is noted that these signals are the same as their counterparts in FIG. 2, except for their cosinusoidal forms rather than sinusoidal forms. To account for this difference, it is only necessary to arrange the synchronization of the generator 34 producing carrier $e_d(t)$ to yield a sinusoidal form rather than a cosinusoidal form, i.e.

$$e_d(t) = E_d \sin((k-1)2\pi f_s t). \tag{55}$$

with this provision taken care of, the rest of signal processing to yield the desired determination of $k\Delta t$ is the same as in FIG. 2.

The determination of $T_\pm$ needed for subsequent use in the calculating circuit 30 to achieve sonic velocity independence can be obtained from the signals $\bar{R}_1(t)$ and $\bar{R}_2(t)$ as shown in FIG. 2. However, FIG. 3 illustrates the use of signals $R''_1(t)$ and $R''_2(t)$ to achieve a similar result. As shown, the signal $R''_1(t)$ or $R''_2(t)$ is passed through an appropriate low-pass filter 28 to remove all but the term in (51) or (52) involving $E''_0$ to yield the time aperture signal $$E_o G(t - T_\pm) \tag{56}$$

as the output. From this aperture signal, the desired determination of $T_\pm$ is obtained as the time interval, from the leading edge to leading edge or center to center, between the gate signal $G(t)$ and the aperture signal of (56).

An alternate embodiment of the instant invention is illustrated in FIG. 4 which essentially replaces the squaring circuits of FIG. 3 with synchroplex detectors which are uniquely suited for the detection of suppressed carrier, AM signals.

The use of squaring circuits introduces unwanted products which must be filtered such as by using band-pass filters 68 and 70. In some cases it may be difficult to design band-pass filters to adequately filter the signals $R''_1(t)$ and $R''_2(t)$. Here again, the synchroplex detectors are an effective alternative.

A modified form of synchroplex detector suitable for the detection of the received signals $R'_1(t)$ and $R'_2(t)$ is indicated generally at 80 in FIG. 5. For simplicity and generality, the operation of the synchroplex detector will be described with respect to the signal $R'(t)$ specified by $$R'(t) = E G(t - T)\sin(w(t - T))\cos(w_1(t - T)). \tag{57}$$

As shown in FIG. 5, the input signal $R'(t)$ is applied simultaneously to one input of a modulator 82 and the input of a squaring circuit 84. The output of squaring circuit 84, $R''(t)$ is specified by $$R''(t) = G(t - T)(E''_0 + E''_1 \cos 2w(t - T) + E_2 \cos 2w_1(t - T). \tag{58}$$

High-pass filter 86 is connected to receive the output of squaring circuit 84 for removing the first two terms of (58) to yield the signal $$R'''(t) = E''' G(t - T)\cos 2w_1(t - T). \tag{59}$$

The signal $R'''(t)$ is applied to one input of an edge-controlled-logic-network, phase comparator 88. The other input in phase comparator 88 is fed by the output of a voltage-controlled oscillator (vco) 90 after processing through a second squaring circuit 92 and high-pass filter 94. If the output of vco 90 is specified by $$e_{vco}(t) = E_{vco}\cos(w_{vco}t + \phi_{vco}), \tag{60}$$

then the corresponding squaring circuit 92 output is $$(e_{vco}(t))^2 = E_{vco}^2 (\tfrac{1}{2} + \tfrac{1}{2}\cos 2.(w_{vco}t + \phi_{vco})), \tag{61}$$

and the signal applied to the second input of the phase comparator 88 is of the form $$E'_{vco}\cos 2(w_{vco}t + \phi_{vco}). \tag{62}$$

The resultant output of the phase comparator 88 is used to control the vco 90. Thus, the arrangement forms a phase-locked loop, with the result that the frequencies and the phases of (59) and (62) are maintained substantially identical. In other words, the operation of the phase-locked loop yields the results:

$$w_{vco} = w_1, \tag{63}$$

$$\phi_{vco} = w_1 T, \tag{64}$$

and therefore, $$e_{vco}(t) = E_{vco}\cos w_1(t - T). \tag{65}$$

The output of the vco 90 is applied to the second input of the modulator 82 to work with the input signal $R'(t)$. Hence, the modulator output is of the form:

$$2\bar{E}G(t - T)\sin w(t - T)\cos^2 w_1(t - T) = \bar{E}G(t - T)\sin w(t - T)(1 + \cos 2w_1(t - T)). \tag{66}$$

The term in (66) involving the frequency $f_1 = w_1/2\pi$ is the unwanted term, which is easily removed by a low-pass filter 96 following modulator 82. The output signal $R(t)$ from the synchroplex detector 80 is, therefore, $$\bar{R}(t) = \bar{E} G(t - T)\sin w(t - T). \tag{67}$$

Note that this differs from the corresponding output of a squaring circuit in that the factor of two in the output frequency is replaced by unity and that the sinusoidal form of the input is preserved.

In addition to the output signal $\bar{R}(t)$, another output in the form of an aperture signal $R''(t)$ is derived from the output of the squaring circuit 84 in FIG. 5. This output signal can be used as a determination of the quantity $T_\pm$.

The squaring circuits used in FIGS. 3–5 can be of various construction. In general, any device or circuit exhibiting an output-input relation approximating a square law can be used. In particular, a modulator with both inputs tied together is an example.

The synchroplex detector 80 is utilized in the embodiment shown in FIG. 4. Because there are no factors of two in the frequencies of the synchroplex detector outputs, the frequency divider used in FIG. 3 between the signal generator 14 and the input of modulator 54 is not needed. The signal $e_2(t)$ indicated in FIG. 3 is thus no longer needed, and the output of generator 14, $e(t)$, is fed directly to modulator 54. The signal $e_t(t)$ from modulator 54 and filter 56 is specified by $$e_t(t) = 2E_t\text{Sin}(wt)\text{Cos}(w_1t) = E_t(\text{Sin}(w_+t) + \text{Sin}(w_-t)), \quad (68)$$

where instead of (47) and (48), $$w_+ = w_1 + w, \quad (69)$$

$$w_- = w_1 - w. \quad (70)$$

The burst to be transmitted across the ultrasound path are bursts of two sinusoidal waveforms of different frequencies separated by a frequency of $2f = w/\pi$.

The received bursts pass through respective T/R switches 10 and 12 and pre-amplifiers 60 and 62 as in FIG. 3. Respective synchroplex detectors 98 and 100 receive input signals $R'_1(t)$ and $R'_2(t)$ and provide output signals as in FIG. 5.

Because the synchroplex detectors 98 and 100 will preserve the sinusoidal form of the received signal bursts, the time magnification demodulation carrier $e_d(t)$ from generator 34 is of cosinusoidal form, i.e.

$$e_d(t) = E_d\text{Cos}((k-1)2\pi f_s t). \quad (71)$$

The outputs of the synchroplex detectors 98 and 100 are the signals $R_1(t)$ and $R_2(t)$ specified by $$R_1(t) = E\,\text{Sin}w(t-T_-) \cdot G(t-T_{31}), \quad (72)$$

and $$R_2(t) = E\,\text{Sin}w(t-T_+) \cdot G(T-T_+). \quad (73)$$

The remainder of the signal processing as shown in FIG. 4 is the same as that for FIGS. 2 and 3 described heretofore.

From either the expressions (53), (54) or (72), (73), it follows that the phase ambiguity condition can be satisfied by selecting the frequency $f = w/2\pi$ to be less than the upper limit computed from (43). For the 10 ft. diameter conduit example considered above, the upper frequency limit computed from (43) was 173,155 hertz. Hence, the choice of $f = 100,000$ hertz will satisfy the phase ambiguity condition with ample tolerance. For the embodiment shown in FIG. 3, the frequency of the signal $e_2(t)$ is then 50,000 hertz. Since the frequency $f_1$ of the $e_1(t)$ signal is unspecified in the general derivation, it can be chosen at will to insure transmission across the ultrasound path with reasonably small attenuation. Assuming that the absorption spectrum of the entrained gas bubbles in the liquid is such that a frequency in the range of 2 megahertz is a good choice, then the frequency $f_1$ can be chosen as 2 megahertz. The frequencies of the ultrasonic signals actually transmitted through the liquid in opposite directions are $f_+ = w_+/2\pi$ and $f_- = w_-/2\pi$. From equations (47) and (48), $f_+ = 2.05$ megahertz and $f_- = 1.95$ megahertz. Note that both are very close to 2 megahertz as desired. For the embodiment shown in FIG. 4, the signal $e(t)$ is used directly in the place of $e_2(t)$. Therefore, the transmit modulating frequency is $f = 100,000$ hertz. If $f_1$ is again chosen to be 2 megahertz, the frequencies $f_+$ and $f_-$ actually transmitted through the liquid are 2.1 megahertz and 1.9 megahertz, which again are also very close to $w$ megahertz as desired.

It is evident that the contrary requirements arising from the phase ambiguity condition and the absorption spectrum of entrained gas bubbles can always be resolved utilizing the apparatus and method of the instant invention. The frequency $f = w/2\pi$ can be chosen to avoid phase ambiguity in the detection of the received ultrasonic signals, and the frequency $f_1 = w_1/2\pi$ can be chosen so as to place the freqencies of signals actually transmitted through the liquid in the region of most favorable transmission characteristics.

It is to be understood that the above-described embodiments are only illustrative of the application of the principles of the invention and that various modifications may be made by those skilled in the art without departing from the spirit and scope of the invention.

We claim:

1. A flow detecting apparatus for measuring fluid flow in a conduit comprising:
   a. a pair of compressional energy transmitting and receiving transducer means adapted to be disposed adjacent said conduit for transmitting compressional energy signals along a path having a component axially of said conduit and a component transversely of said conduit, and for receiving said compressional energy signals transmitted along said path,
   b. means for generating a first signal having a frequency, $f$, less than a predetermined upper limit, for providing unambiguous phase detection between signals received by said transducer means,
   c. means for generating a second signal having a frequency $f_1$,
   d. means for mixing said first and second signals to produce sideband frequencies $f_1 + f$ and $f_1 - f$, said frequency $f_1$ selected so that said sideband frequencies $f_1 + f$ and $f_1 - f$ are transmitted over a selected part of the spectrum,
   e. means for applying at least one of said sideband frequencies to said transducer means, for transmitting signal bursts in opposite directions along said path, and
   f. means for processing said received signals for providing a signal corresponding to (1) the transit time, $t$, of one of said signals along said path, (2) the square of the transit tiem $t^2$, and (3) the difference in transit time $\Delta t$ between said received signals, said processing means further providing a quotient signal proportional to $\Delta t$ divided by $t^2$, said quotient signal being substantially proportional to the velocity, $v$, of fluid flow such that $\Delta t$ divided by $t^2$ is proportional to $v$ divided by $l$, where $l$ is the length of said path.

2. A flow detection apparatus as recited in claim 1 wherein said predetermined upper limit of said frequency $f$ is given by $c^2$ divided by $2vl$ where $c$ is the propagation velocity in a stationary fluid.

3. A flow detection apparatus as recited in claim 1 wherein said means for processing said received signals comprises means for mixing said received signals with a modulating signal for producing a single cycle sinusoidal waveform for each received burst.

4. A flow detection apparatus as recited in claim 1 wherein said apparatus further comprises means for dividing the frequency $f$ of said first signal by a factor of two, said frequency dividing means connected between said first signal generating means and said mixing means.

5. A flow detection apparatus as recited in claim 1 wherein said frequencies $f$ and $f_1$ are the ultrasonic frequency range.

6. A flow detection apparatus as recited in claim 1 wherein said processing means comprises:
 a. a squaring circuit for receiving said burst signals from said transducer means,
 b. filter means connected to said squaring circuit for providing an output signal,
 c. means for modulating said output signal from said filter means with a modulating signal having a frequency approximately equal to $f$, for producing sinusoidal waveforms,
 d. zero-crossing detector means connected to said modulating means for providing signals indicative of the zero-crossing of said sinusoidal waveforms, and
 e. means responsive to the zero-crossing of sinusoidal waveforms corresponding to received burst signals from each of said pair of transducer means for providing said difference signals $\Delta t$.

7. A flow detection apparatus as recited in claim 6 wherein said means responsive to the zero-crossing of said sinusoidal waveforms comprise:
 means for establishing the zero-crossing time of one of said sinusoidal waveforms corresponding to received burst signals from one of said pair of transducer means as the leading edge of a square wave signal, and
 means for establishing the zero-crossing time of another of said sinusoidal waveforms corresponding to received burst signals from another of said pair of transducer means as the trailing edge of said square wave signal.

8. A flow detection apparatus as recited in claim 6 wherein said apparatus further comprises means for dividing the frequency $f$ of said first signal, said frequency dividing means connected between said first signal generating means and said mixing means.

9. A flow detection apparatus as recited in claim 8 wherein said modulating means provides a single cycle sinusoidal waveform corresponding to each received burst signal.

10. A flow detection apparatus as recited in claim 6 wherein said first signal generating means generates a signal $k$ times $f_0$ and said modulating signal has a frequency $(k-1)f_o$, where $k$ is the number of cycles in a signal burst.

11. A flow detection apparatus as recited in claim 1 wherein said processing means for providing a signal corresponding to the difference in transit time $66\ t$ comprises:
 a. a synchroplex detector circuit for receiving burst signals from said transducer means,
 b. means for modulating the output of said synchroplex detection circuit with a modulating signal for providing sinusoidal waveforms,
 c. zero-crossing detector means connected to said modulating means for providing signal indicative of the zero-crossing of said sinusoidal waveforms, and
 d. means responsive to the zero-crossing of sinusoidal waveforms corresponding to received burst signals from each of said pair of transducer means for providing said difference signal $\Delta t$.

12. A flow detection apparatus as recited in claim 11 wherein said synchroplex detector circuit comprises:
 a. a first squaring circuit connected to receive said burst signals from said transducer means,
 b. a phase-lock-loop circuit connected to receive the output of said first squaring circuit for providing an output modulating signal, and
 c. modulator means connected to receive said output modulating signal and said burst signals from said transducer means for providing an output.

13. A flow detection apparatus as recited in claim 12 wherein said phase-lock-loop circuit comprises in series, a phase comparator having two inputs, a voltage control oscillator and second squaring circuit, the output of said second squaring circuit connected to one input of said phase comparator and the other input of said phase comparator connected to receive the output of said first squaring circuit, said voltage control oscillator connected to provide said output modulating signal.

14. In an ultrasonic flow measuring apparatus which provides a measure of fluid flow in a pipe by utilizing two spaced transducers for transmitting and receiving ultrasonic burst signals, said transducers providing an energy flow path therebetween having a non-zero component axially along said pipe, said apparatus providing transit time signals, $t$, for each of said received signals and difference time signals, $\Delta t$, representing the difference in time between corresponding transit time signals, and providing a flow determination utilizing a quotient signal $\Delta t$ divided by $t^2$, the improvement comprising:
 means for generating a first signal having a frequency $f$ less than a predetermined amount,
 means for generating a second signal,
 means for mixing said first and second signals to produce upper and lower sideband signals,
 means for simultaneously applying said sideband signals to said transducers for transmitting same and
 means for mixing said received burst signals with a modulating signal for producing a single cycle sinusoidal waveform corresponding to each received signal.

15. Apparatus as recited in claim 14 wherein said predetermined amount is defined by requiring an unambiguous phase determination for corresponding received burst signals in said transducers.

16. Apparatus as recited in claim 15 wherein said predetermined amount is given by $c^2$ divided by $2vl$ where $c$ is the velocity of ultrasonic propagation in a stationary fluid and $l$ is the length of said path.

17. Apparatus as recited in claim 14 wherein said means for mixing comprises amplitude modulating said second signal with said first signal.

18. Apparatus as recited in claim 17 wherin said amplitude modulating is of the suppressed carrier type.

19. A method of measuring fluid flow in a pipe from received pairs of signals comprising the steps of:
 a. generating a first signal having a frequency, $f$, selected to permit unambiguous phase comparision between said pairs of received signals,
 b. generating a second signal having a frequency $f_1$,
 c. mixing said first and second signals to provide upper and lower side frequencies, said second frequency selected to permit substantially unattenuated signal transmission of said side frequencies through said fluid,
 d. simultaneously transmitting said side frequencies as a pair of oppositely directed burst signals along a path through said pipe,
 e. receiving said transmitted oppositely directed burst signals in axially spaced receiving means, f. utilizing said received signals for generating a transit time signal $t$ corresponding to the time between simultaneous transmission and reception of said signals, g. generating a difference signal $\Delta t$ corresponding to the time between said received burst signals, and h. providing a quotient signal $\Delta t$ divided by $t^2$ approximately proportional to $v$, where $v$ is the fluid flow velocity.

20. A method as recited in claim 19 wherein said mixing step comprises amplitude modulating said second signal with said first signal.

21. A method as recited in claim 19 wherein said transmitting step comprises transmitting only said side frequencies while suppressing carrier frequencies.

22. A method as recited in claim 19 further comprising the steps of:

a. mixing modulating signal with each of said received burst signals to provide a single cycle sinusoidal waveform, b. detecting the zero-crossing times of each of said sinusoidal waveforms, and c. utilizing the zero-crossing times to provide said difference signal $k\Delta t$, where $k$ is the number of cycles of frequency $f$ in a burst.

23. A method as recited in claim 19 further comprising the step of visually indicating the fluid flow $v$.

* * * * *